US010096051B2

(12) United States Patent
Hosein et al.

(10) Patent No.: US 10,096,051 B2
(45) Date of Patent: Oct. 9, 2018

(54) METHOD AND SYSTEM TO FACILITATE TRANSACTIONS

(71) Applicant: eBay Inc., San Jose, CA (US)

(72) Inventors: Marc Peter Hosein, Saratoga, CA (US); Selina Lam, Castro Valley, CA (US); Han-Shen Yuan, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 616 days.

(21) Appl. No.: 14/668,529

(22) Filed: Mar. 25, 2015

(65) Prior Publication Data

US 2015/0278900 A1 Oct. 1, 2015

Related U.S. Application Data

(60) Provisional application No. 61/972,682, filed on Mar. 31, 2014.

(51) Int. Cl.
*G06Q 30/00* (2012.01)
*G06Q 30/06* (2012.01)
(Continued)

(52) U.S. Cl.
CPC ......... *G06Q 30/0619* (2013.01); *G06Q 30/06* (2013.01); *G06Q 30/08* (2013.01); *G06Q 50/01* (2013.01)

(58) Field of Classification Search
CPC .... G06Q 30/0619; G06Q 50/01; G06Q 30/06; G06Q 30/08
(Continued)

(56) References Cited

U.S. PATENT DOCUMENTS 6,029,141 A * 2/2000 Bezos ............... G06Q 20/0855
705/26.41
6,141,666 A * 10/2000 Tobin ............... G06F 17/30893
707/E17.117
(Continued)

FOREIGN PATENT DOCUMENTS

CN 106415648 A 2/2017
KR 1020100091669 A 8/2010
(Continued)

OTHER PUBLICATIONS

"Patents; Researchers Submit Patent Application, "System and Method for an E-Commerce System Related to Wear Apparel", for Approval"; Published in Computer Weekly News [Atlanta], Oct. 25, 2012; extracted from Dialog on May 22, 2018.*
(Continued)

*Primary Examiner* — Yogesh C Garg
(74) *Attorney, Agent, or Firm* — Schwegman Lundberg & Woessner, P.A.

(57) ABSTRACT

Method and system are provided to facilitate transactions in a particular on-line trading platform from a third party web site. The system may be configured to associate identification information, such as a uniform resource locator (URL), with a reference to an item of merchandise on a web page provided by a third party entity. In response to a request originated from a client device of a user, the method may cause presentation of a listing of the item of merchandise maintained in the particular on-line trading platform and a visual control to facilitate commencing of a transaction process with respect to the item of merchandise in the on-line trading platform.

14 Claims, 9 Drawing Sheets

(51) Int. Cl.
*G06Q 50/00* (2012.01)
*G06Q 30/08* (2012.01)

(58) Field of Classification Search
USPC ............... 705/26.1, 27.1, 26.43, 26.44, 319
See application file for complete search history.

(56) References Cited

U.S. PATENT DOCUMENTS

| | | | | |
|---|---|---|---|---|
| 7,480,627 | B1* | 1/2009 | Van Horn | G06Q 10/087 |
| | | | | 705/14.16 |
| 7,539,632 | B1* | 5/2009 | Chakrabarti | G06Q 30/02 |
| | | | | 705/26.1 |
| 7,831,548 | B1* | 11/2010 | Round | G06F 17/30893 |
| | | | | 707/609 |
| 8,606,643 | B2 | 12/2013 | Lawrence et al. | |
| 2004/0088251 | A1* | 5/2004 | Moenickheim | G06Q 20/10 |
| | | | | 705/39 |
| 2005/0108170 | A1* | 5/2005 | Hailpern | G06F 21/10 |
| | | | | 705/51 |
| 2007/0271156 | A1 | 11/2007 | Sarusi et al. | |
| 2009/0319388 | A1 | 12/2009 | Yuan et al. | |
| 2012/0316942 | A1* | 12/2012 | Sheperd | G06Q 30/0214 |
| | | | | 705/14.16 |
| 2013/0260727 | A1 | 10/2013 | Knudson et al. | |

FOREIGN PATENT DOCUMENTS

| KR | 1020140006174 A | 1/2014 |
|---|---|---|
| KR | 1020140024558 A | 3/2014 |

OTHER PUBLICATIONS

"International Application Serial No. PCT/US2015/023365, International Search Report dated Jul. 6, 2015", 2 pgs.
"International Application Serial No. PCT/US2015/023365, Written Opinion dated Jul. 6, 2015", 6 pgs.
"Korean Application Serial No. 2016-7030247, Office Action dated Mar. 15, 2017", W/ English Translation, 13 pgs.
"Korean Application Serial No. 2016-7030247, Response filed Jul. 14, 2017 to Office Action dated Mar. 15, 2017", w/ English claims, 20 pgs.

* cited by examiner

METHOD AND SYSTEM TO FACILITATE TRANSACTIONS

RELATED APPLICATION

This application claims the benefit of priority to U.S. Provisional Patent Application Ser. No. 61/972,682, filed on Mar. 31, 2014, which is incorporated herein in its entirety.

TECHNICAL FIELD

This application relates to the technical fields of software and/or hardware technology and, in one example embodiment, to system and method to facilitate transactions in a particular on-line trading platform from a third party web site.

BACKGROUND

An on-line trading platform allows users to shop for almost anything using, e.g., a web browser application or an application native to a mobile device. A user may find an item listed by an on-line trading application by entering keywords into the search box provided on an associated web page or by browsing through the list of categories on the home page. After reading the item description and viewing the seller's reputation, the user may be able to either place a bid on the item or purchase it instantly. There are many features provided by an on-line trading application that may be utilized by users in unique ways that may result in a successful shopping experience. A user may encounter an item of interest on a web site other than a web site associated with the on-line trading platform. The user may be able to determine keywords that describe that item of interest, access the web site associated with the on-line trading platform and attempt to locate that item in the on-line trading platform.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
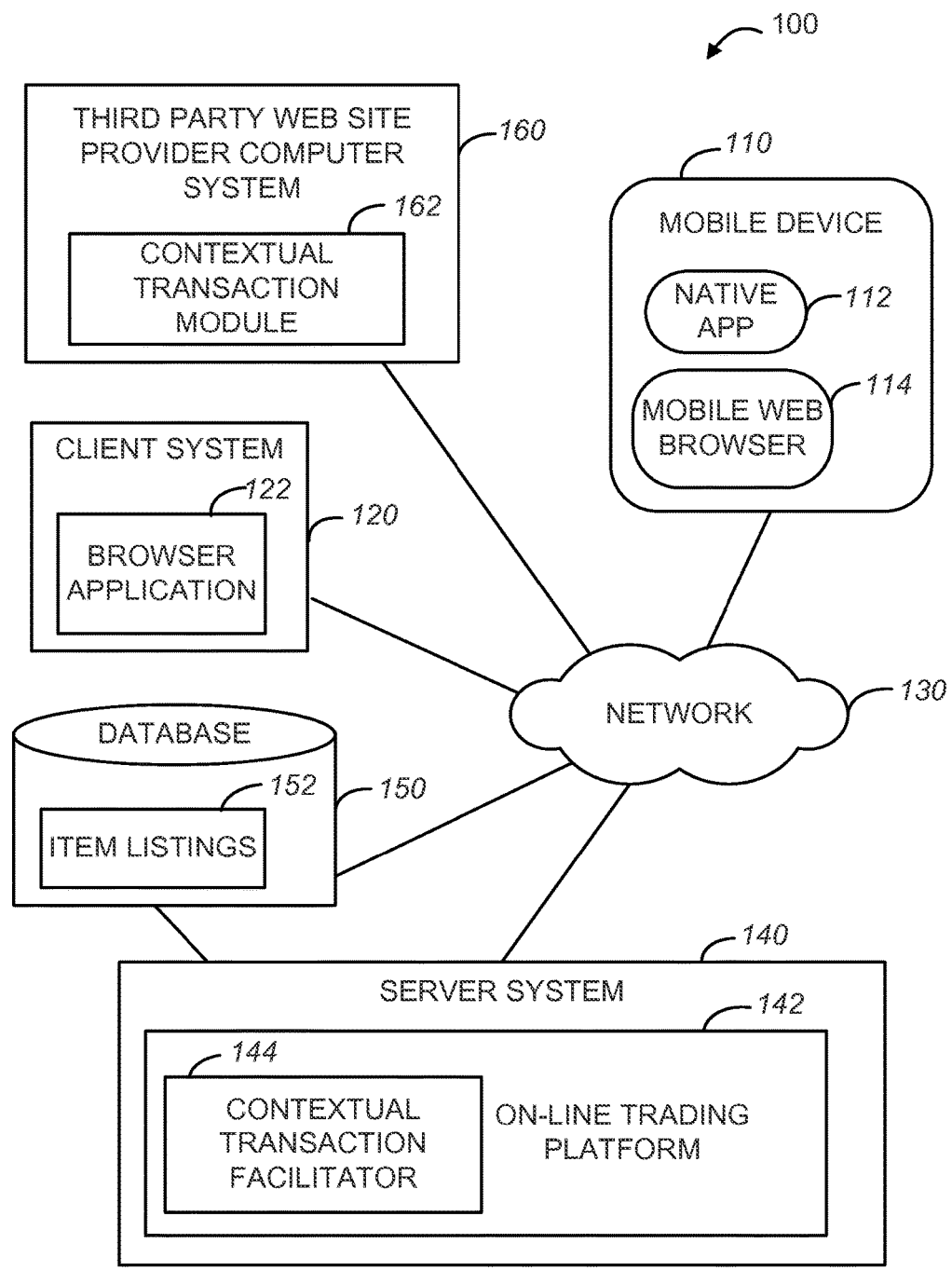
FIG. 1 is a diagrammatic representation of a network environment within which an example method and system to facilitate transactions in a particular on-line trading platform from a third party web site may be implemented.

Method and system to facilitate transactions in a particular on-line trading platform from a third party web site is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

A computer user may visit various web sites (referred to as third party web sites) that are distinct from a web site of the on-line trading platform. While visiting such third party web sites, the user may notice an item that they may be interested in purchasing. The user may then leave the third party web site, access the trading web site, attempt to locate a listing that represents the item of interest and, if such listing exists in a database maintained by the on-line trading platform, purchase the item using the transaction functionality of the on-line trading platform. Method and system to facilitate transactions in a particular on-line trading platform from a third party web site may be utilized beneficially to enhance a user's experience in purchasing items referenced on third party web pages.

In one example embodiment, an on-line trading platform may be configured to cooperate with a web site controlled by a third party provider such that the presentation of an item on the third party web site is associated with information linking the presentation of the item to a listing that is maintained by the on-line trading platform. The information linking the presentation of the item to a listing that is maintained by the on-line trading platform may be referred to as item identification information or merely an item identification. The item identification information may be, e.g., in the form of a Uniform Resource Locator (URL) or some other form. When a user encounters, on a third party web site, a presentation of an item that is linked to a listing maintained by the on-line trading platform, the user may simply click on the presentation of the item, which may cause presentation of a visual control selectable to launch a transaction processing flow facilitated by the on-line trading platform, without requiring the user to leave the third party web site. When a transaction is facilitated and processed by the on-line trading platform with respect to an item represented on a third party web site and without requiring the user to leave the third party web site, such third party web site may be referred to as a context setter web site.

In one embodiment, a third party web site may communicate with the on-line trading platform via an Application Programming Interface (API) provided to the third party web site by the on-line trading platform. An API provided to the third party web site by the on-line trading platform that permits a user to purchase, via the on-line trading platform, an item presented on a third party web site, may be termed a contextual transaction module. A contextual transaction module may be generated at the on-line trading platform and made available for use by third party web sites.

A contextual transaction module may be configured to associate a presentation of an item on a context setter web site that hosts the contextual transaction module with information linking the presentation of the item to a listing that is maintained by the on-line trading platform. The operation of associating may take place, e.g., at the time an image of an item is uploaded to context setter web site. A context setter web site may be designed to allow users to save images and categorize them on different web pages that may be termed boards. Users of such web site can choose other users' boards based on their overlapping interests and follow those boards for new content. For example, such web site may facilitate pinboard-style social photo sharing by allowing users to create and manage theme-based image collections. These collections of images may be categorized based on events, interests, hobbies, etc. Users of such web site can browse other users' pinboards for inspiration, can re-post (or 're-pin') images from other users' boards to their own collections or indicate that they like a particular image. A contextual transaction module may be configured to associate an image posted on such a pinboard with an identification linking it to a listing maintained by the on-line trading platform at the time the image is being uploaded to the pinboard. Other types of third party web sites that may utilize a contextual transaction module may be other social networking systems that permit users exchange textual and/or graphical information that may reference items of merchandise (e.g., Twitter®, sites providing a forum for discussing television programs, movies, etc.).

In order to facilitate transactions in a particular on-line trading platform from a third party web site, the on-line trading platform may include a module or a component termed a contextual transaction facilitator. A contextual transaction facilitator may be configured to interact with a contextual transaction module executing at a context setter web site.

In some embodiments, a contextual transaction facilitator may be configured to embed links to the listing pages of the on-line trading platform within images presented on a web page of a context setter web site. A contextual transaction facilitator may also provide integration between a mobile app of the on-line trading platform and a mobile app of the provider of a context setter web site. A contextual commerce system may also be configured to create a listing in the on-line trading platform on the fly, as a user uploads an image to a context setter web site.

An example method and system to facilitate transactions in a particular on-line trading platform from a third party web site may be implemented in the context of a network environment 100 illustrated in FIG. 1. As shown in FIG. 1, the network environment 100 may include client devices 110 and 120, and a server system 140. The client device 110 may be a mobile device executing a native app 112 or a mobile web browser 114. The native app 112 may be providing access to services executing on the server system 140, such as, for example, to services provided by an on-line trading platform 142. The client devices 110 and 120 (e.g., via a browser application 122) may have access to the server system 140 hosting the on-line trading platform 142 via a communications network 130. The communications network 130 may be a public network (e.g., the Internet, a mobile communication network, or any other network capable of communicating digital data).

As shown in FIG. 1, the server system 140 is in communication with a database 150 that stores item listings 152. An item listing is a publication related to goods and/or services being offered for sale. The server system 140 also hosts a contextual transaction facilitator 144. In one example embodiment, the contextual transaction facilitator 144 is configured to cooperate with a contextual transaction module 162 executing at a context setter web site provided by a third party web site provider computer system 160.

In some embodiments, the contextual transaction facilitator 144 includes a billing system integration module to integrate the billing process with the billing system provided by the on-line trading platform 142. For example, the contextual transaction facilitator 144 may be configured to initiate so-called channel-initiated billing, where a partnered entity (a third party web site provider) authorizes the on-line trading platform 142 to initiate the billing process on their behalf. In some embodiments, the contextual transaction facilitator 144 may be extended by facilitating partnership with other providers of web-based services e.g., to permit "rebolstering" to allow spot buying.

Figure 2:
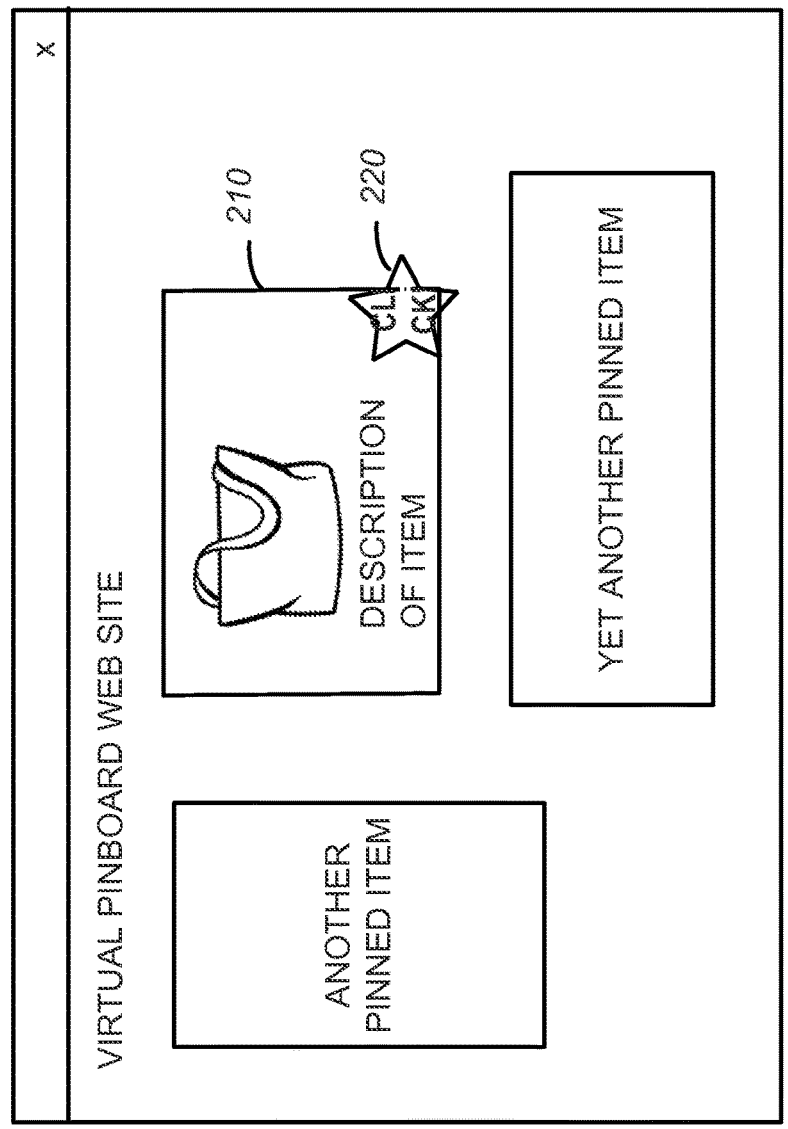
FIG. 2 is an example User Interface screen illustrating a web page from a context setter web site that includes a presentation of an item that is linked to a listing in an on-line trading platform, in accordance with an example embodiment.

In operation, when the contextual transaction module 162 provided with a context setter web site detects an indication that a user may be interested in purchasing an item that is referenced or depicted at the context setter web site, the contextual transaction module 162 may commence a process of facilitating a transaction with respect to the item in the on-line trading platform 142 without requiring the user to leave the context setter web site. An indication that a user may be interested in purchasing an item may be, e.g., detecting that the user engaged a "like" control associated with an image of the item, detecting that the user clicked on an image of the item, or hovered over an image of the item for certain duration of time. Shown in FIG. 2 is a screen 200 illustrating a web page from a context setter web site. In the example provided in FIG. 2, a context setter web site is a virtual pinboard web site. An item of interest is displayed in area 210 and an indication of a click action is depicted by element 220 (the element 220 is not displayed and is provided to illustrate a user action).

Figure 3:
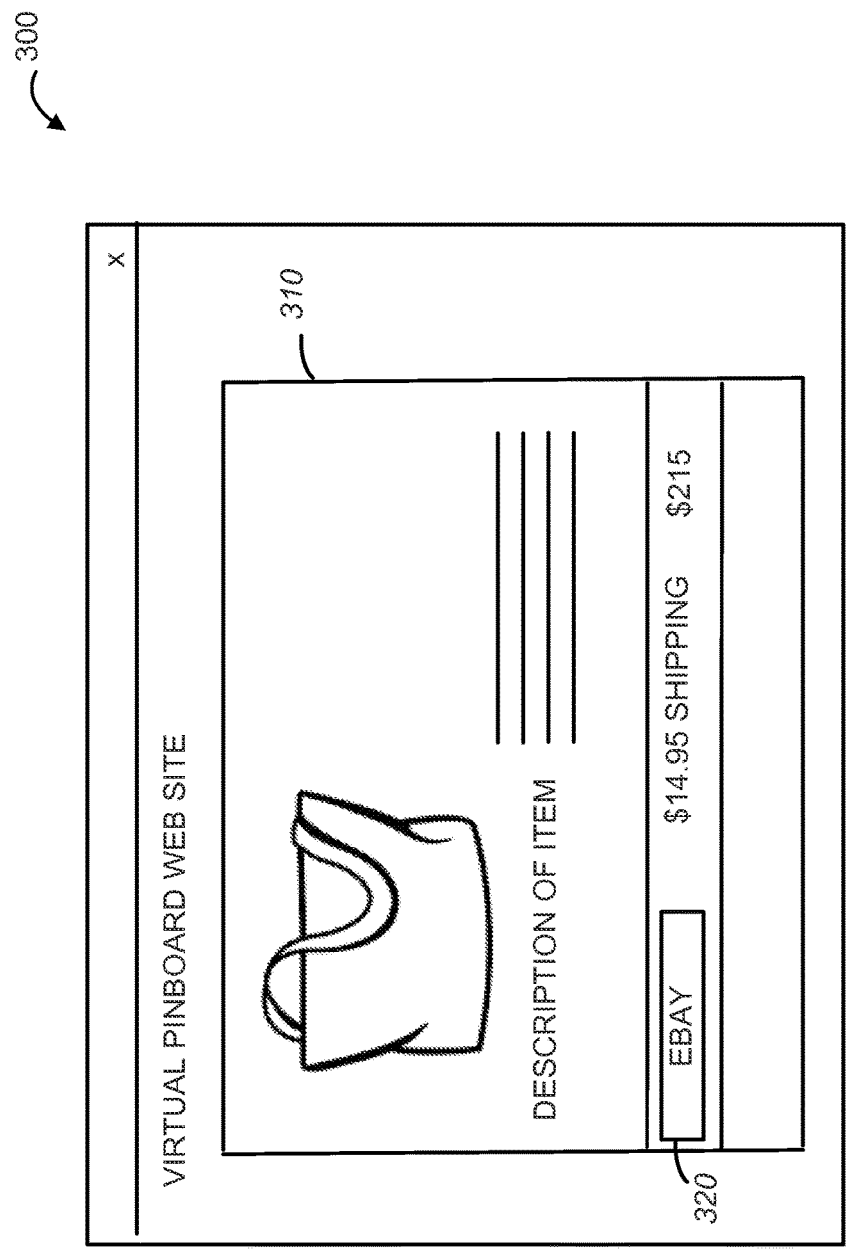
FIG. 3 is an example User Interface screen illustrating a web page from a context setter web site presenting a contextual commerce visual control selectable to cause a transaction processing flow to be commenced in an on-line trading platform with respect to an item presented on the context setter web site, in accordance with an example embodiment.

In response to detecting an indication that a user may be interested in purchasing an item (that may be termed an item of interest), the contextual transaction module 162 of FIG. 1 may determine whether the presentation of the item is associated with an item identification that links the presentation of the item to a listing maintained by the on-line trading platform 142 of FIG. 1. If the presentation of the item is associated with an item identification that links the presentation of the item to a listing maintained by the on-line trading platform 142, the contextual transaction module 162 displays a so-called contextual commerce visual control selectable to cause a transaction processing flow to be commenced in the on-line trading platform 142. Shown in FIG. 3 is a screen 300 illustrating a web page from the virtual pinboard web site. Information describing the item of interest is displayed in area 310. Also shown in the area 310 is "EBAY" control 320. "EBAY" control 320 is a contextual commerce visual control selectable to cause a transaction processing flow to be commenced in the on-line trading platform 142. Ebay® is a registered trademark of eBay, Inc. The information regarding the price for the item and the shipping cost may be obtained by the contextual transaction module 162 from the on-line trading platform.

When the contextual transaction module 162 of FIG. 1 detects the selection of the "EBAY" control 320, it sends a communication to the contextual transaction facilitator executing at the on-line trading platform 142 of FIG. 1. The communication to the contextual transaction facilitator executing at the on-line trading platform 142 includes an identification of the item of interest represented in the area 310 of FIG. 3 and a request to facilitate a transaction, in the on-line trading platform 142, with respect to an item represented by the item identification. A user interface configured to facilitate, in the on-line trading platform 142, a transaction with respect to an item presented at a context setter web site may be referred to as a transaction flow user interface.

Figure 4:
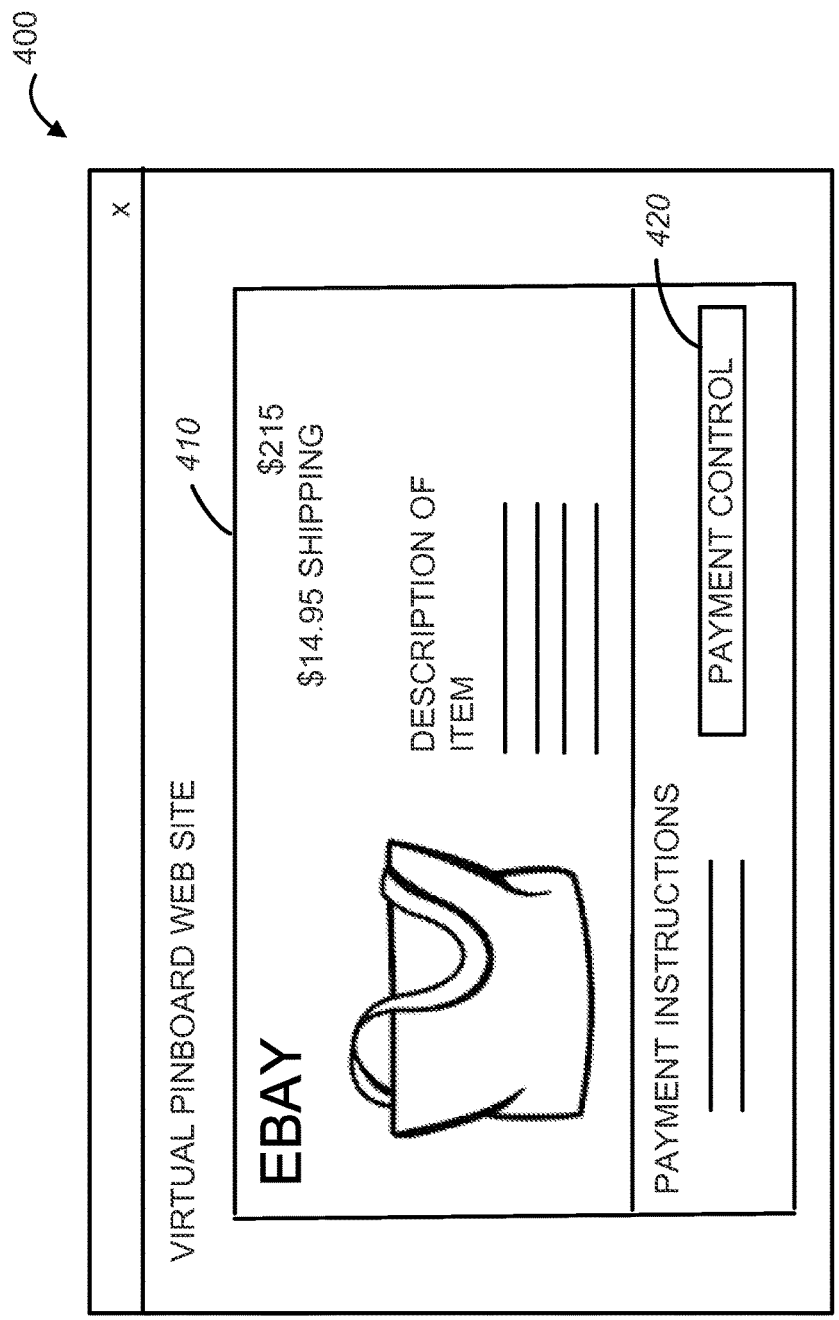
FIG. 4 is an example User Interface screen illustrating a web page from a context setter web site including a transaction flow user interface received from an on-line trading platform, in accordance with an example embodiment.

The contextual transaction facilitator 144, which is provided with the on-line trading platform 142, upon receiving the request from the contextual transaction module 162, accesses a listing that corresponds to the identification of the item of interest, and provides, to the server 160 hosting the context setter web site, a transaction flow user interface that can be used for commencing a transaction with respect to the item of interest. Shown in FIG. 4 is a screen 400 illustrating a user interface for commencing a transaction with respect to the item of interest. The user interface for commencing a transaction with respect to the item of interest, also termed a transaction flow user interface, is shown in area 410, which is presented within a layout controlled by the context setter web site (here the virtual pinboard site). The user interface presented in the area 410 includes information from the listing (e.g., an image and a description of the item of interest, the price information, etc.), as well as a visual control for effectuating payment (here a button 420 titled "Payment Control").

In one embodiment, an identification of an item presented at a context setter web site may be associated with multiple listings in the on-line trading platform 142, e.g., listings of the same item provided by different vendors. Where an item presented at a context setter web site is associated with listings of the same item provided by different vendors, the contextual transaction facilitator 144 may be configured to determine whether the item offered by one of the vendors is out of stock and, if so, select the listing by a vendor that has the item of interest in stock and use that listing to be included into the transaction flow user interface.

Figure 5:
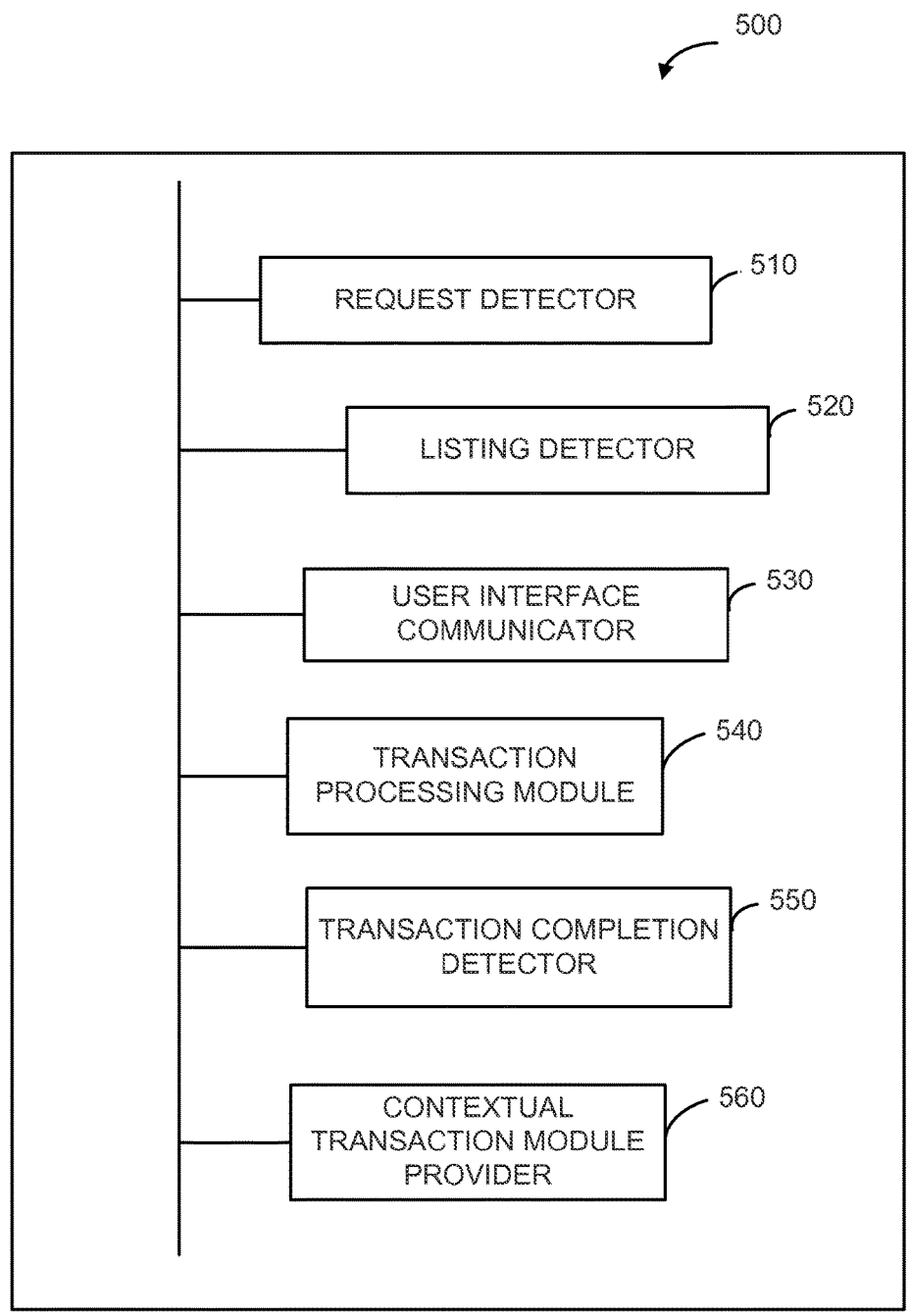
FIG. 5 is block diagram of a contextual transaction facilitator provided at an on-line trading platform, in accordance with one example embodiment.

FIG. 5 is block diagram of a system 500 (that, in one embodiment, corresponds to the contextual transaction facilitator 144 provided at the on-line trading platform 142 of FIG. 1), in accordance with one example embodiment. As shown in FIG. 5, the system 500 includes a request detector 510, a listing detector 520, and a user interface communicator 530. The request detector 510 may be configured to receive, at a trading platform server (e.g., the server system 140 of FIG. 1), from a context setter web site server (e.g., the third party web site provider computer system 160 of FIG. 1), an item identification and a request to facilitate a transaction with respect to an item represented by the item identification. As mentioned above, the item identification may be a URL.

The listing detector 520 may be configured to access, in response to the request, a listing that corresponds to the item identification. The listing may be stored in the database 150 of FIG. 1. The listing detector 520 may also be configured to determine that the item identification corresponds to multiple listings associated with respective distinct vendors. The listing detector 520 may determine that one of the listings represents an out-of-stock item with respect to its associated vendor and select the listing associated with a vendor that has the item in stock to be included into the transaction flow user interface.

The user interface communicator 530 may be configured to communicate, to the context setter web site server, a transaction flow user interface. The transaction flow user interface comprises information from the listing and also a visual control selectable to initiate a transaction in the on-line trading platform with respect to the item, using a transaction processing module 540. The system 500 also includes a transaction completion detector 550, which may be configured to detect that the transaction process is completed and communicate the transaction completion status to the third party web site provider computer system 160.

Also shown in FIG. 5 is a contextual transaction module provider 560. The contextual transaction module provider 560 may be configured to generate a contextual transaction module and provide the contextual transaction module to a context setter web site. A contextual transaction module generated by the contextual transaction module provider 560 may be configured to detect an indication of a user interest with respect to the item presented at a context setter web site, to determine that a presentation of the item at the context setter web site is associated with the identification information (the identification information linking the presentation of the item to a listing in the in an on-line trading platform), to display in response to the determining a contextual commerce visual control selectable to cause a transaction processing flow to be commenced by the on-line trading platform, and to communicate to the on-line trading platform the item identification and a request to facilitate a transaction with respect to an item represented by the item identification in response to detecting a selection of the contextual commerce visual control. An example contextual transaction module is also described further below, with reference to FIG. 7 and FIG. 8.

Figure 6:
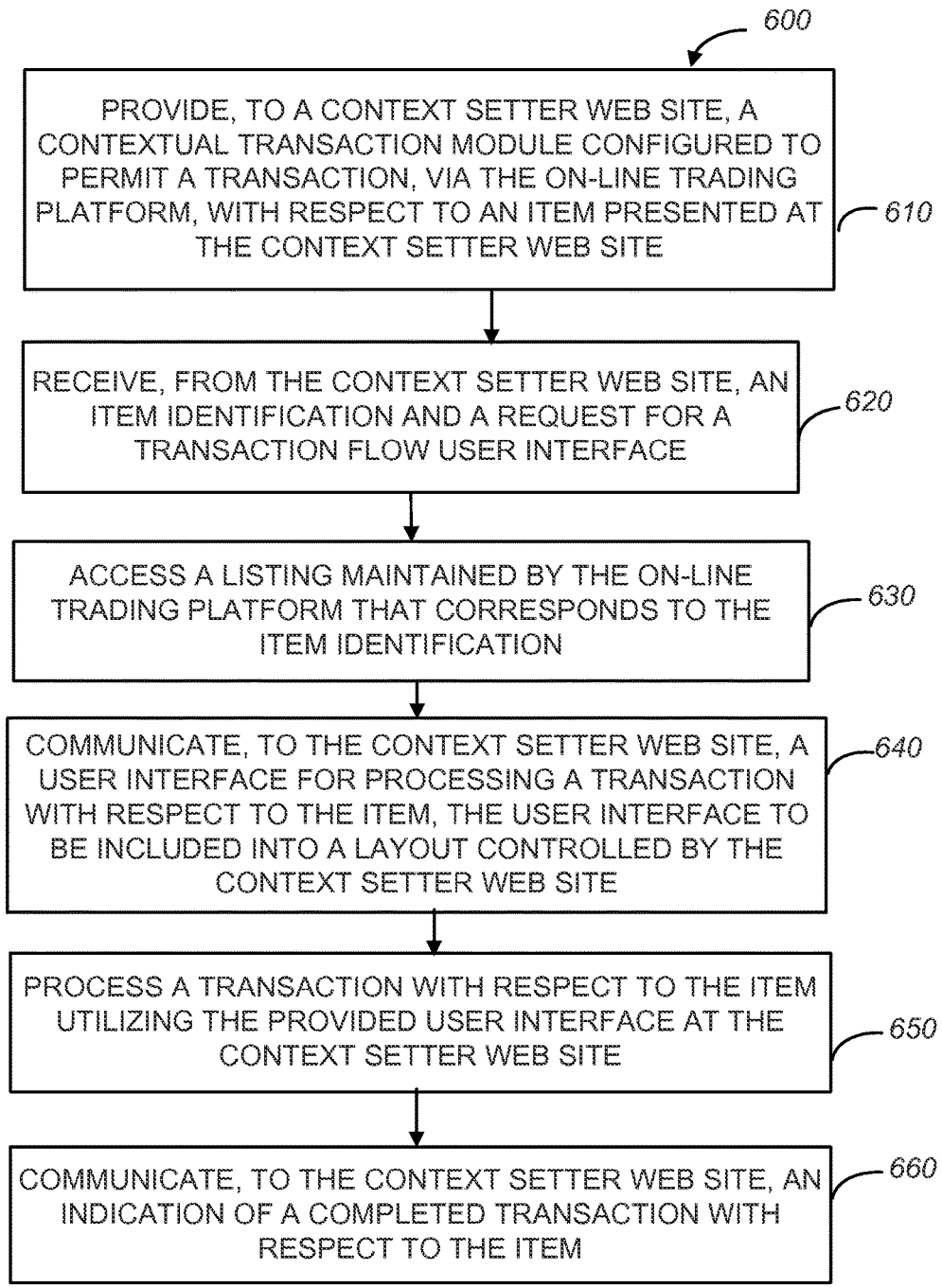
FIG. 6 is a flow chart of a method performed at an on-line trading platform to facilitate transactions in the on-line trading platform from a context setter web site, in accordance with an example embodiment.

FIG. 6 is a flow chart of a method 600 performed at an on-line trading platform to facilitate transactions in the on-line trading platform from a context setter web site, in accordance with an example embodiment. The method 600 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1.

As shown in FIG. 6, the method 600 commences at operation 610, when the contextual transaction module provider 560 of FIG. 5, executing at an on-line trading platform, provides, to a context setter web site, a contextual transaction module. The contextual transaction module is configured to permit a transaction with respect to an item presented at the context setter web site via the on-line trading platform. At operation 620, the request detector 510 of FIG. 5 receives, from the context setter web site, an item identification and a request for a transaction flow user interface. At operation 630, the listing detector 520 of FIG. 5 accesses a listing maintained by the on-line trading platform that corresponds to the item identification. At operation 640, the user interface communicator 530 of FIG. 5 communicates, to the context setter web site, a user interface for processing a transaction with respect to the item (a transaction flow user interface). The user interface is to be included into a layout controlled by the context setter web site. An example of a transaction flow user interface is shown in FIG. 4, which was described above. At operation 650, the transaction processing module 540 of FIG. 5 processes a transaction with respect to the item, utilizing the user interface at the context setter web site. At operation 660, the transaction completion detector 550 of FIG. 5 communicates an indication of a completed transaction with respect to the item to the context setter web site.

Figure 7:
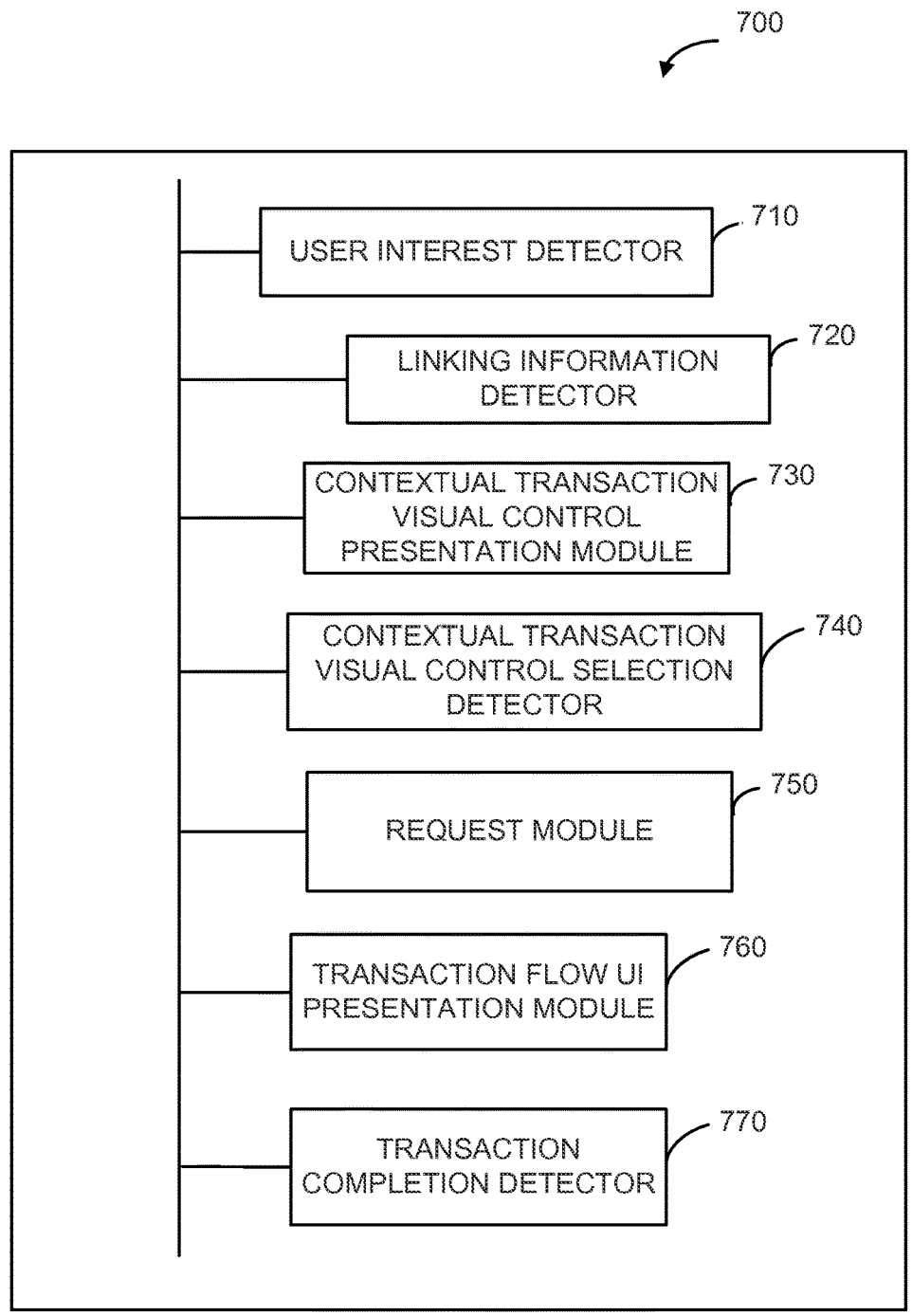
FIG. 7 is block diagram of a contextual transaction module provided at a context setter web site, in accordance with one example embodiment.

FIG. 7 is block diagram of a system 700 (that, in one embodiment, corresponds to the contextual transaction module 162 provided at the third party web site provider computer system 160 of FIG. 1), in accordance with one example embodiment. As shown in FIG. 7, the system 700 includes a user interest detector 710, a linking information detector 720, a contextual transaction visual control presentation module 730, a contextual transaction visual control selection detector 740, a request module 750, a transaction flow UI presentation module 760, and a transaction completion detector 770. Some example operations performed by the modules of the system 700 may be described with reference to FIG. 8.

Figure 8:
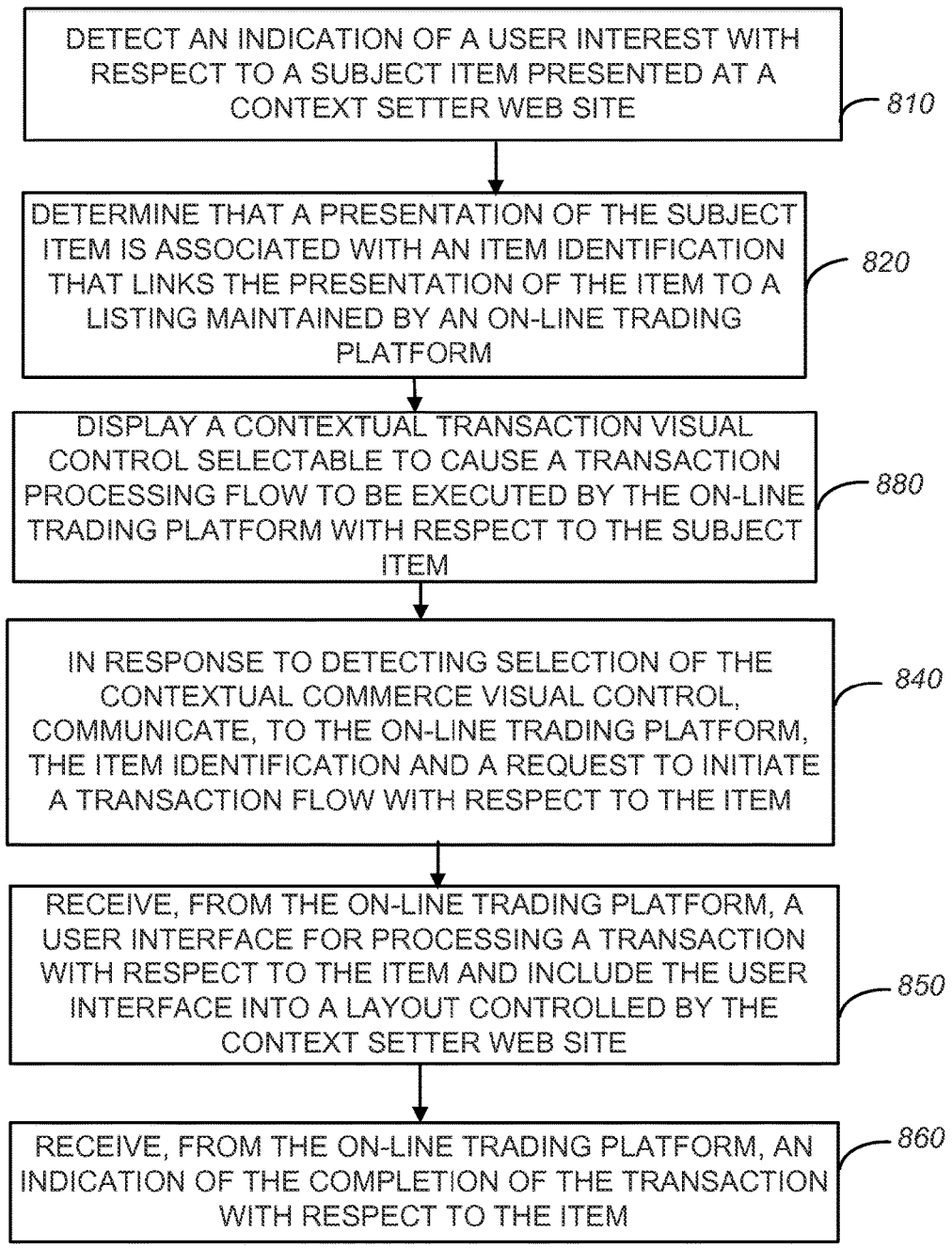
FIG. 8 is a flow chart of a method performed at a context setter web site to facilitate transactions in the on-line trading platform, in accordance with an example embodiment.

FIG. 8 is a flow chart of a method 800 performed at a context setter web site to facilitate transactions in an on-line trading platform, in accordance with an example embodiment. The method 800 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the computer system 160 of FIG. 1.

As shown in FIG. 8, the method 800 commences at operation 810, when the user interest detector 710 of FIG. 7 detects an indication of a user interest with respect to a subject item presented at a context setter web site. At operation 820, a linking information detector 720 of FIG. 7, determines that a presentation of the subject item is associated with an item identification that links the presentation of the item to a listing maintained by an on-line trading platform. At operation 830, the contextual transaction visual control presentation module 730 of FIG. 7 displays a contextual transaction visual control selectable to cause a transaction processing flow to be executed by the on-line trading platform with respect to the subject item. An example presentation of a contextual transaction visual control is illustrated in FIG. 3, which was described above.

At operation 840, a contextual transaction visual control selection detector 740 of FIG. 7 detects selection of the contextual commerce visual control and the request module 750 of FIG. 7, in response to detecting selection of the contextual commerce visual control, communicates, to the on-line trading platform, the item identification and a request to initiate a transaction flow with respect to the item. At operation 850, the transaction flow UI presentation module 760 of FIG. 7 receives, from the on-line trading platform, a user interface for processing a transaction with respect to the item and includes the user interface into a layout controlled by the context setter web site. An example presentation of the transaction flow UI is illustrated in FIG. 4, which was described above. At operation 860, the transaction completion detector 770 of FIG. 7 receives, from the on-line trading platform, an indication of the completion of the transaction with respect to the item.

Figure 9:
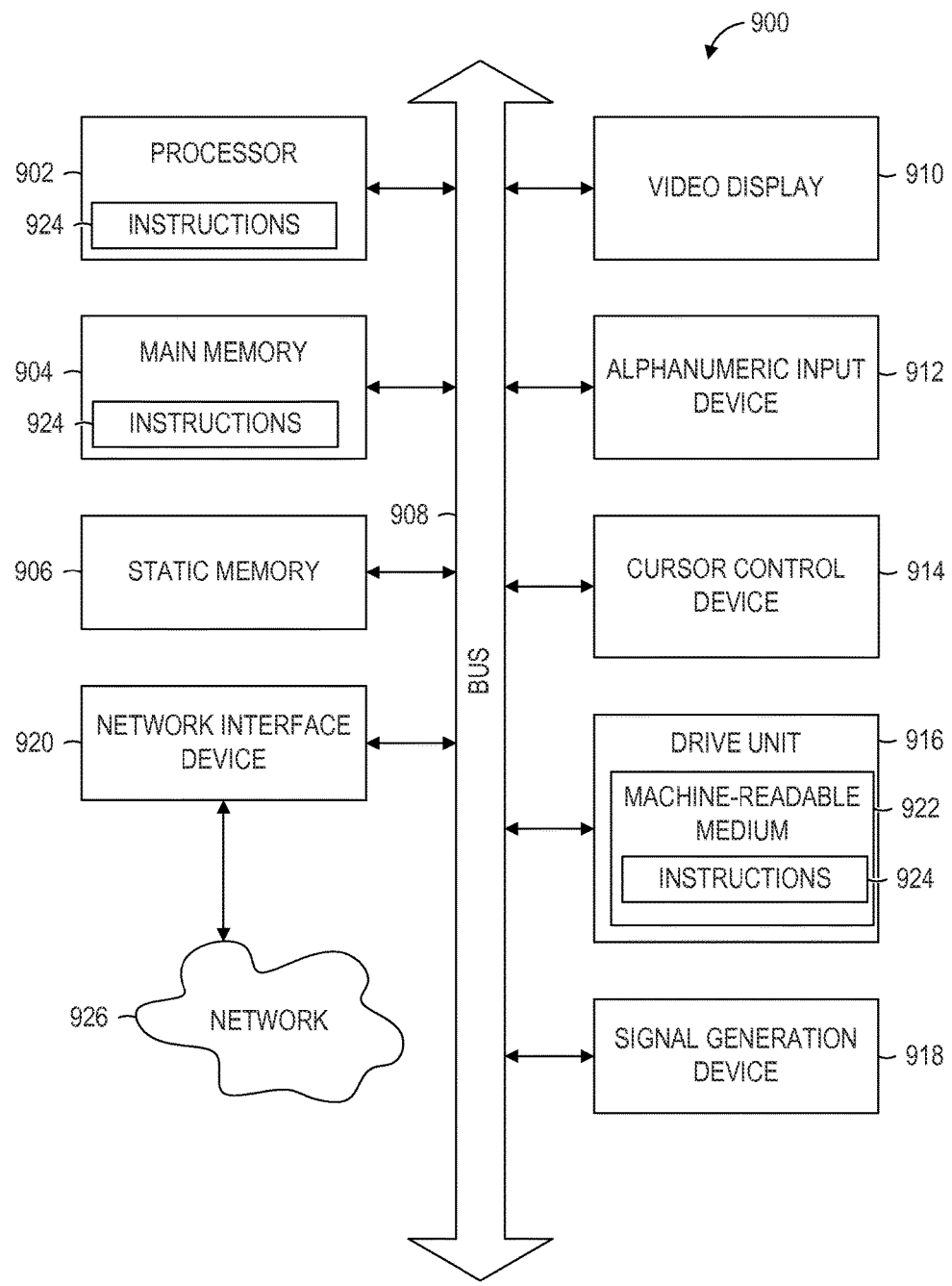
FIG. 9 is a diagrammatic representation of an example machine in the form of a computer system within which a set of instructions, for causing the machine to perform any one or more of the methodologies discussed herein, may be executed.

FIG. 9 is a diagrammatic representation of a machine in the example form of a computer system 900 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 909. The computer system 900 may further include a video display unit 910 (e.g., a liquid crystal display (LCD) or a cathode ray tube (CRT)). The computer system 900 also includes an alpha-numeric input device 912 (e.g., a keyboard), a user interface (UI) navigation device 914 (e.g., a cursor control device), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, with the main memory 904 and the processor 902 also constituting machine-readable media.

The software 924 may further be transmitted or received over a network 926 via the network interface device 920 utilizing any one of a number of well-known transfer protocols (e.g., Hyper Text Transfer Protocol (HTTP)).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like. A carrier medium comprises a tangible machine readable medium or a transient medium carrying instructions for causing a machine to implement the method, such as a signal e.g. a transmission medium, an electrical signal, an optical signal, or an electromagnetic signal.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Thus, method and system to facilitate transactions in a particular on-line trading platform from a third party web site have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A system comprising:
   one or more processors; and
   a non-transitory computer readable storage medium comprising instructions that when executed by the one or processors cause the one or more processors to perform operations comprising:
   from a trading platform server hosting an on-line trading platform, providing a contextual transaction module to a context setter web site server hosting a context setter web site, the contextual transaction module configured to detect an indication of a user interest with respect to an item presented at the context setter web site, to determine that the presentation of the item at the context setter web site is associated with identification information linking the presentation of the item to a listing in the on-line trading-platform, and in response to the determining display a contextual commerce visual control selectable to obtain a transaction flow (UI) from the on-line trading platform;

receiving, at the trading platform server, from the context setter web site server, an item identification and a request to facilitate a transaction with respect to an item represented by the item identification;

in response to the received request, accessing the listing using the item identification;

causing presentation of the transaction flow UI within a layout controlled by the context setter web site, the transaction flow UI comprising information from the listing and a visual control selectable to initiate a transaction in the on-line trading platform with respect to the item.

2. The system of claim 1, wherein the identification information linking the presentation of the item to a listing in the on-line trading platform is a uniform resource locator (URL).

3. The system of claim 1, wherein the non-transitory computer readable storage medium comprises instructions that when executed by the one or processors cause the one or more processors to perform operations comprising:
  determining that the item identification corresponds to the listing and to a further listing, the listing and the further listing associated with respective distinct vendors;
  determining that the further listing represents an out-of-stock item with respect its associated vendor; and
  selecting the listing to be included into the transaction flow user interface.

4. The system of claim 1, wherein the contextual transaction module is to:
  in response to detecting a selection of the contextual commerce visual control, communicate, to the on-line trading platform, the item identification and the request to facilitate a transaction with respect to an the item represented in the on-line trading platform by the item identification.

5. The system of claim 1, wherein the context setter web site is a social networking web site.

6. The system of claim 1, wherein the item is an electronic resource or a tangible good.

7. The system of claim 1, wherein the identification information linking the presentation of the item to a listing in the on-line trading platform corresponds to an image, an alpha-numeric string, or an audio clip.

8. A computer-implemented method comprising:
  from a trading platform server hosting an on-line trading platform, providing a contextual transaction module to a context setter web site server hosting a context setter web site, the contextual transaction module configured to detect an indication of a user interest with respect to an item presented at the context setter web site, to determine that the presentation of the item at the context setter web site is associated with identification information linking the presentation of the item to a listing in the on-line trading platform, and in response to the determining display a contextual commerce visual control selectable to obtain a transaction flow (UI) from the on-line trading platform;
  receiving, at the trading platform server, from the context setter web site server, an item identification and a request to facilitate a transaction with respect to an item represented by the item identification;
  in response to the received request, accessing the listing using the item identification;
  causing presentation of the transaction flow UI within a layout controlled by the context setter web site, the transaction flow UI comprising information from the listing and a visual control selectable to initiate a transaction in the on-line trading platform with respect to the item.

9. The method of claim 8, wherein the identification information linking the presentation of the item to a listing in the on-line trading platform is a uniform resource locator (URL).

10. The method of claim 8, wherein the accessing of the listing comprises:
  determining that the item identification corresponds to the listing and to a further listing, the listing and the further listing associated with respective distinct vendors;
  determining that the further listing represents an out-of-stock item with respect to its associated vendor; and
  selecting the listing to be included into the transaction flow user interface.

11. The method of claim 8, wherein the contextual transaction module is to:
  in response to detecting a selection of the contextual commerce visual control, communicate, to the on-line trading platform, the item identification and the request to facilitate a transaction with respect to an the item represented in the on-line trading platform by the item identification.

12. The method of claim 8, wherein the context setter web site is a social networking web site.

13. The method of claim 8, wherein the item is an electronic resource or a tangible good.

14. A machine-readable non-transitory storage medium having instruction data executable by a machine to cause the machine to perform operations comprising:
  from a trading platform server hosting an on-line trading platform, providing a contextual transaction module to a context setter web site server hosting a context setter web site, the contextual transaction module configured to detect an indication of a user interest with respect to an item presented at the context setter web site, to determine that the presentation of the item at the context setter web site is associated with identification information linking the presentation of the item to a listing in the on-line trading platform, and in response to the determining display a contextual commerce visual control selectable to obtain a transaction flow (III) from the on-line trading platform;
  receiving, at the trading platform server, from the context setter web site server, an item identification and a request to facilitate a transaction with respect to an item represented by the item identification;
  in response to the received request, accessing a listing that corresponds to the item identification;
  causing presentation of the transaction flow UI within a layout controlled by the context setter web site, the transaction flow UI comprising information from the listing and a visual control selectable to initiate a transaction in the on-line trading platform with respect to the item.

* * * * *

UNITED STATES PATENT AND TRADEMARK OFFICE
CERTIFICATE OF CORRECTION

PATENT NO.         : 10,096,051 B2
APPLICATION NO.    : 14/668529
DATED              : October 9, 2018
INVENTOR(S)        : Marc Peter Hosein et al.

Page 1 of 1

It is certified that error appears in the above-identified patent and that said Letters Patent is hereby corrected as shown below:

In the Claims

Column 11, Line 7, Claim 1, delete "trading-platform," and insert -- trading platform, --, therefor.

Column 11, Line 43, Claim 4, delete "an the" and insert -- the --, therefor.

Column 12, Line 32, Claim 11, delete "an the" and insert -- the --, therefor.

Column 12, Line 54, Claim 14, delete "(III)" and insert -- (UI) --, therefor.

Signed and Sealed this
Twelfth Day of February, 2019

Andrei Iancu
*Director of the United States Patent and Trademark Office*